(12) United States Patent
Kumar

(10) Patent No.: US 11,640,484 B1
(45) Date of Patent: May 2, 2023

(54) MULTI-ENVELOPE ENCRYPTION SYSTEM

(71) Applicant: Amazon Technologies, Inc., Seattle, WA (US)

(72) Inventor: Sandeep Kumar, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 242 days.

(21) Appl. No.: 17/249,634

(22) Filed: Mar. 8, 2021

(51) Int. Cl.
| | |
|---|---|
| *G06F 21/60* | (2013.01) |
| *G06F 21/78* | (2013.01) |
| *G06F 21/62* | (2013.01) |
| *G06F 7/58* | (2006.01) |
| *G06F 11/14* | (2006.01) |

(52) U.S. Cl.
CPC ............. *G06F 21/78* (2013.01); *G06F 7/582* (2013.01); *G06F 11/1435* (2013.01); *G06F 21/602* (2013.01); *G06F 21/6209* (2013.01); *G06F 2201/84* (2013.01); *G06F 2221/0755* (2013.01)

(58) Field of Classification Search
CPC ............... G06F 21/602; G06F 21/6209; G06F 21/6218; G06F 21/78; G06F 2221/0751; G06F 2221/0755; G06F 7/582; G06F 11/1453; G06F 2201/84; H04L 9/0822; H04L 9/0894

See application file for complete search history.

(56) References Cited

U.S. PATENT DOCUMENTS

| | | | |
|---|---|---|---|
| 8,588,425 B1 * | 11/2013 | Harwood | G06F 12/1408 380/278 |
| 10,021,075 B1 * | 7/2018 | Saad | G06F 11/2097 |
| 2019/0173674 A1 * | 6/2019 | Agarwal | H04L 9/0891 |
| 2022/0069983 A1 * | 3/2022 | Yoshida | H04L 9/083 |

\* cited by examiner

*Primary Examiner* — Minh Dinh
(74) *Attorney, Agent, or Firm* — Knobbe, Martens, Olson & Bear, LLP

(57) ABSTRACT

Multi-envelope encryption provides redundancy for highly-available storage of encrypted data. Data, such as a "snapshot" representing values of every block of a block storage volume or device at a specific point in time, may be encrypted before storage to prevent unauthorized access to the data. To further protect the data and prevent unauthorized access to the data, additional security measures may be taken. Multiple copies of the data key that is to be used to decrypt the data may be encrypted and stored separately from the encrypted data as envelopes. The different envelopes may each be encrypted using envelope keys. If one envelope key is later lost or otherwise becomes unavailable, the encrypted data can still be accessed by using a different envelope key to recover the data key and decrypt the data.

20 Claims, 7 Drawing Sheets

MULTI-ENVELOPE ENCRYPTION SYSTEM

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, setup with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

When computing resources are used by or at the direction of a user, data may be loaded, generated, modified, or the like. The data may be stored for access by additional computing resources and/or at later times. To protect the data from unauthorized access, the data may be encrypted. An encryption key used to encrypt and/or decrypt the data may be specified by or otherwise associated with the user. This user-specific key configuration can help to prevent access to the unencrypted data by other users.

DETAILED DESCRIPTION

Figure 1:
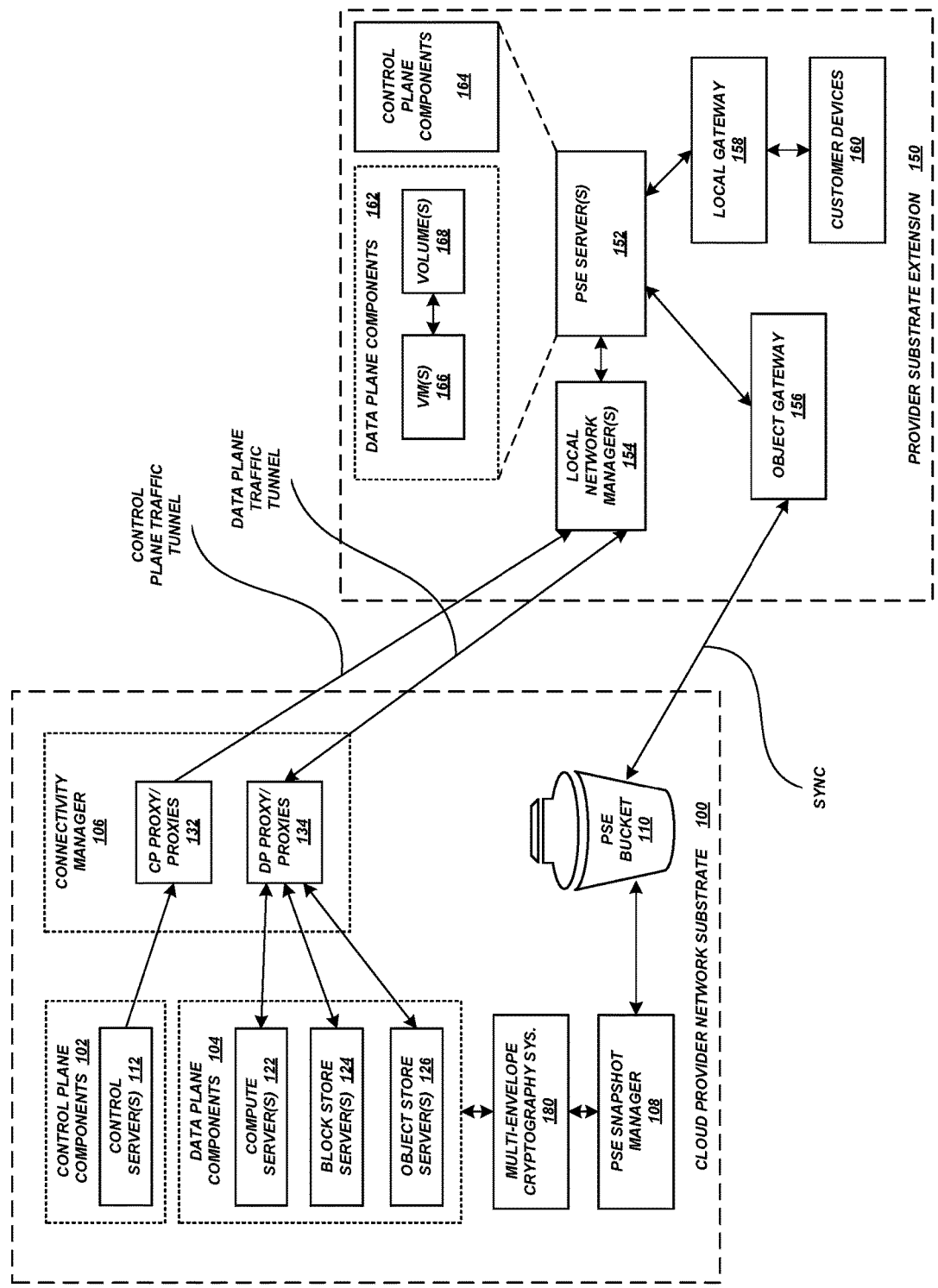
FIG. 1 is a block diagram of an example cloud provider network extended by a provider substrate extension located within a network external to the cloud provider network according to some embodiments.

Generally described, the present disclosure relates to management of cryptographic keys used to access encrypted data. Data, such as a "snapshot" representing values of every block of a block storage volume or device at a specific point in time, may be encrypted before storage to prevent unauthorized access to the data. To further protect the data and prevent unauthorized access to the data, additional security measures may be taken. Multiple copies of the cryptographic key that is to be used to decrypt the data—also referred to as a "data key"—may be encrypted and stored separately from the encrypted data. Each encrypted copy of the data key may be referred to as an "encryption envelope" or more simply as an "envelope." The different envelopes may each be encrypted using different cryptographic envelope keys, also referred to as "envelope keys." If one envelope key is later lost or otherwise becomes unavailable, the encrypted data can still be accessed by using a different envelope key to recover the data key from a different envelope. The recovered data key may then be used to decrypt the stored data. Such multi-envelope encryption provides redundancy for highly-available storage of encrypted data.

Some data storage systems encrypt data using customer-provided or customer-managed data keys, or keys otherwise associated with individual customers. This implementation can help to prevent unauthorized access by other customers. However, if a customer-provided data key is lost or otherwise becomes unavailable, the total amount of encrypted data that may be rendered inaccessible (also referred to as the "blast radius") may be quite large, potentially encompassing all of a customer's data. To reduce the blast radius associated with any given data key, unique (or statistically unique) data keys may be used for each data item or subset thereof. However, using unique data keys for each data item may introduce other security risks and key management implications, including how to securely maintain a large number of data keys without re-introducing a large blast radius or compromising the security of the data keys and the underlying data protected by the data keys.

Some aspects of the present disclosure address the issues above, among others, by generating multiple envelopes of encrypted data keys. A given data key may be a symmetric encryption key (e.g., the same key that was used to encrypt the data is also used to decrypt the data) or a decryption key that is separate from the encryption key used to encrypt the data (e.g., using public key or other forms of asymmetric cryptography). In some embodiments, the data key is encrypted within two or more different encryption envelopes, and each of the two or more different encryption envelopes are encrypted using a different envelope key than every other encryption envelope being generated for the data key. Encrypting the data key with envelope keys provides an additional layer of protection beyond using the data key to encrypt the data to be stored. The envelope keys may be drawn from a set of envelope keys that are used to generate many envelopes. The blast radius associated with each individual envelope key is mitigated by creating multiple envelopes for a given data key using multiple different envelope keys. Moreover, intelligent management and use of the envelope keys can reduce or substantially eliminate the effective blast radius associated with individual envelope keys. In some embodiments, the process of generating encryption envelopes may further be based on access credentials associated with the user who controls the data being encrypted. Generating envelopes based on access credentials can help to ensure that the envelopes are only accessible by users with corresponding access credentials, even if other users have access to the envelope keys.

Additional aspects of the present disclosure relate to intelligent use of envelope keys. In some embodiments, the set of envelope keys may be segregated into two or more mutually-exclusive groups whereby each envelope key is a member of one and only one group. Each group of envelope keys may be referred to as an "envelope key group" or simply as a "key group." Each envelope key group may be managed such that its failure domain is different (or substantially different) than the failure domains of other groups. When multiple copies of a data key are encrypted to generate multiple envelopes, the envelope keys to generate the envelopes may be chosen from different key groups. In this way, if one of the envelope keys is lost or otherwise unavailable when the corresponding envelope is to be decrypted, one of the other envelope keys used to generate one of the other envelopes is likely to still be available due to the non-overlapping (or substantially non-overlapping) failure domains of the various envelope key groups from which the envelope keys are drawn.

Further aspects of the present disclosure relate to intelligent management of envelope keys such that each group of envelope keys has a different failure domain than each other group of envelope keys. In some embodiments, each envelope key group is maintained by or otherwise associated with a different account (e.g., different administrator account) than each other key group. The envelope key groups to which each user account has access to maintain may be mutually exclusive: the user account(s) permitted to maintain one group are not permitted to maintain another group, and the user account(s) permitted to maintain the other group are not permitted to maintain the first group. Thus, a single account can be prevented from affecting envelope keys in multiple key groups at the same time, which would potentially put encrypted data items at risk of loss if the envelope keys for each encryption envelope associated with the encrypted data items were to be affected. In some embodiments, when an account is modifying a key group, the entire set of envelope keys in all key groups can be locked from other modifications until a verification criterion is satisfied. For example, when an account is adding an envelope key to a key group, retiring an envelope key from a key group, modifying a policy associated with an envelope key in a key group, or otherwise performing an action that affects an envelope key in a key group, the entire set of envelope keys (including those in other key groups) can enter a state in which further modifications are prevented. By preventing changes to other envelope keys including those in other key groups, the likelihood that a single modification will cause the loss of data keys is reduced or eliminated because the data keys are encrypted into multiple envelopes, each using envelope keys from different key groups. Once the modification is made, a verification workflow may be performed to determine whether the modification has impacted envelope key usage in a negative or otherwise unexpected way. If the modification has not impacted envelope key usage in a negative or otherwise unexpected way, the set of envelope keys can enter an unlocked state permitting a subsequent modification. In some embodiments, to further reduce or eliminate the chance that a modification to a particular envelope key or key group will cause data loss by impacting an envelope key in another key group, the verification workflow may be performed for each other key group before the entire set of envelope keys can enter an unlocked state.

Various aspects of the disclosure will now be described with regard to certain examples and embodiments, which are intended to illustrate but not limit the disclosure. Although aspects of some embodiments described in the disclosure will focus, for the purpose of illustration, on particular examples of cryptographic keys, encryption and decryption algorithms, data storage structures, and the like, the examples are illustrative only and are not intended to be limiting. In some embodiments, the techniques described herein may be applied to additional or alternative cryptographic keys, encryption and decryption algorithms, data storage structures, and the like.

Overview of Example Computing Environment

With reference to an illustrative embodiment, FIG. 1 shows an example computing environment in which features of the present disclosure may be implemented. As shown, the computing environment includes a cloud provider network substrate 100 (also referred to herein as a "cloud provider network," "provider network," "cloud provider system", or simply as a "cloud" for convenience) and a provider substrate extension 150 (also referred to herein as a "provider network extension" or simply as a "PSE" for convenience) that is a remote extension of the cloud provider network 100. The cloud provider network 100 and the PSE 150 may communicate with each over via an intermediate network (not shown), such as the Internet.

The cloud provider network 100 is a pool of network-accessible computing resources (such as compute, storage, and networking resources, applications, and services), which may be virtualized or bare-metal. The cloud provider network 100 can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example allowing users to have at their disposal scalable "virtual computing devices" via their use of the compute servers 122 (which provide compute instances via the usage of one or both of CPUs and GPUs, optionally with local storage) and block store servers 124 (which provide virtualized persistent block storage for designated compute instances). These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An application programming interface (API) refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

A cloud provider network 100 can be formed as a number of regions, where a region is a separate geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Customers can connect to availability zones of the cloud provider network via a publicly accessible network (e.g., the Internet, a cellular communication network). Transit Centers (TC) are the primary backbone locations linking customers to the cloud provider network, and may be co-located at other network provider facilities (e.g., Internet service providers, telecommunications providers). Each region can operate two TCs for redundancy.

The cloud provider network 100 can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators (NATs), and so on, as well as the physical connections among the devices. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server 122, a block store server 124, an object store server 126, a control server 112) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components 102 distributed across and implemented by one or more control servers 112. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane generally includes one or more data plane components 104 distributed across and implemented by one or more data plane servers. The data plane includes customer resources that are implemented on the cloud provider network 100 (e.g., computing instances, containers, block storage volumes, databases, file storage, etc., as described in greater detail below). Data plane traffic generally includes non-administrative operations such as transferring data to and from the customer resources.

The control plane components 102 are typically implemented on a separate set of servers from the data plane components 104, and control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane components 104 can include one or more compute servers 122, which may be bare metal (e.g., single tenant) or may be virtualized by a hypervisor to run multiple VMs (sometimes referred to as "instances") for one or more customers. These compute servers 122 can support a virtualized computing service of the cloud provider network 100. The cloud provider network 100 may offer virtual compute instances with varying computational and/or memory resources. In one embodiment, each of the virtual compute instances may correspond to one of several instance types. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane can also include one or more block store servers 124, which can include persistent storage for storing volumes of customer data as well as software for managing these volumes. These block store servers can support a managed block storage service of the cloud provider network 100. The block store servers 124 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte TB (or more) in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane can also include one or more object store servers 126, which represent another type of storage within the cloud provider network 100. The object storage servers 126 include one or more servers on which data is stored as objects within resources referred to as buckets, and can be used to support a managed object storage service of the cloud provider network 100. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that can be used to restore volumes.

In some embodiments, a snapshot is a point-in-time block-level backup of a volume, stored as a copy of data on the volume on one or more of the object storage servers 126 (e.g., as a single object or a collection of objects). However, unlike other data stored on the object storage servers 126, snapshots may not be directly accessible within object storage buckets, and instead are accessible through the API of the block store servers 124. In one example, snapshots are implemented as incremental records of data within a volume. Illustratively, when the first snapshot of a volume is taken, all blocks of the volume that contain valid data are copied as one or more objects to the object storage servers 126, and then a snapshot definition or "manifest" file is written to the object storage servers 126 that includes a record of the one or more objects, as well as the blocks of the volume to which each of the one or more objects correspond. Due to the use of incremental snapshots, when the subsequent snapshots are taken of the same volume, only the blocks that have changed since the first snapshot need to be copied to the object storage servers 126, and the manifest can be updated to point to the latest versions of each data block (or a second manifest can be created, enabling the initial manifest to remain as a record of a prior version of the volume). An initial snapshot can be used to reconstruct the volume at the time of the initial snapshot, or snapshots from subsequent time points can be combined together or with the initial snapshot to reconstruct the entire volume at any individual subsequent point in time. In this way snapshots can serve as both incremental backups and a full backup of a given volume.

When creating a snapshot, any data written to the volume up to the time the snapshot is started can be included in the snapshot, and users can continue to perform I/O operations to their volumes during snapshot creation without affecting the snapshot. Users can create a new volume from a snapshot, for example to create duplicates of their volumes or to restore data. The new volume will contain all the data stored in the snapshot and thus will be a duplicate of the original volume at the time the snapshot was started. In this manner, snapshots can also be used to transfer a volume's data from one availability zone to another. Similarly, snapshots can be taken of computing resource instances to create a "machine image" of that instance stored in the object storage servers 126, and new copies of the instance can be launched from the machine image.

Users can instruct the cloud provider network 100 to create snapshots of their volumes on the block store servers 124 and store the snapshots on the object store servers 126. A snapshot can then be used to create a new volume with information matching the volume captured in the snapshot, for example providing the benefit of feeding the volume data to the new copy without impacting I/O operations at other replicas of the volume. Further, due to the greater redundancy of the object store servers 126 provided in some embodiments, such snapshots may provide a more resilient backup copy of a volume than additional copies stored on the block store servers 124. Another benefit of using a snapshot to create a new volume copy is that it may provide the ability to replicate the volume across availability zones, while the block store servers 124 may only support replication within a given availability zone.

The connectivity manager 106 (including control plane proxies 132 and data plane proxies 134), PSE snapshot manager 108, and PSE bucket 110 depicted in the cloud provider network 100 may be provisioned in a particular region or availability zone of the cloud provider network 100 in response to the creation of a substrate extension 150, and are described in further detail below.

Some customers may desire to use the resources and services of the cloud provider network 100, but for various reasons (e.g., latency in communications with customer devices, legal compliance, security, or other reasons) prefer for these resources and services to be provisioned within their own network, for example on premises of the customer. The technology described herein enables a piece of the cloud provider network—referred to herein as a "provider substrate extension" or PSE 150—to be provisioned within the customer's network. A customer may access their PSE 150 via the cloud provider network 100 or their own network, and may use the same APIs to create and manage resources in the PSE 150 as they would use to create and manage resources in the cloud provider network 100 region.

The PSE 150 may be pre-configured, e.g. by the provider network operator, with the appropriate combination of hardware with software and/or firmware elements to support various types of computing-related resources, and to do so in a manner that mirrors the experience of using the cloud provider network 100. For example, one or more PSE servers 152 can be provisioned by the cloud provider within the customer network. As described above, the cloud provider network 100 may offer a set of predefined instance types, each having varying types and quantities of underlying hardware resources. Each instance type may also be offered in various sizes. In order to enable customers to continue using the same instance types and sizes in their PSE 150 as they do in the cloud provider network 100 region, the PSE server 152 can be a heterogeneous server. A heterogeneous server can concurrently support multiple instance sizes of the same type, and may be also reconfigured to host whatever instance types are supported by its underlying hardware resources. The reconfiguration of the heterogeneous server can occur on-the-fly using the available capacity of the PSE server 152, meaning while other VMs are still running and consuming other capacity of the PSE server 152. This can improve utilization of resources within the PSE 150 by allowing for better packing of running instances on physical hosts, and also provides a seamless experience regarding instance usage across the cloud provider network 100 region and PSE 150.

As illustrated, the PSE servers 152 can host one or more VMs 166. The customer can use these VMs 166 to host containers, which package up code and all its dependencies so an application can run quickly and reliably from one computing environment to another. In addition, the PSE servers 152 may host one or more data volumes 168, if desired by the customer. In the cloud provider network 100 region, such volumes may be hosted on dedicated block store servers 124. However, due to the possibility of having a significantly smaller capacity in the PSE 150 than in the region, it may not provide an optimal utilization experience if the PSE 150 includes such dedicated block store servers. Accordingly, the block storage service may be virtualized in the PSE 150, such that one of the VMs runs the block store software and stores the data of the volume. Similar to the operation of the block storage service in the region, the volumes within a PSE 150 may be replicated for durability and availability. The volumes may be provisioned within their own VPC within the PSE 150. The VMs 166 and any volumes 168 collectively make up the data plane components 162 within the PSE 150 that are an extension of the provider network data plane 162.

The PSE servers 152 may, in some implementations, host certain local control plane components 164, for example components that enable the PSE 150 to continue functioning if there is a break in the connection back to the cloud provider network 100 region. Examples of these components include a migration manager that can move VMs between PSE servers if needed to maintain availability, a key value data store that indicates where volume replicas are located, and a local VM placement component that can respond to requests for new VMs made via the customer network. However, generally the control plane for the PSE 150 will remain in the cloud provider network 100 region, in order to allow the customer to use as much capacity of the PSE 150 as possible. At least some VMs 166 that are set up at the PSE 150, and associated higher-level services that use such VMs 166 as building blocks, may continue to function even during periods of time when connectivity to the provider network data centers is temporarily disrupted in some embodiments.

Server software may be designed by the cloud provider to run on the cloud provider network 100, and this software may be enabled to run unmodified in a PSE 150 by using the local network manager(s) 154 to create a private replica of the cloud provider network 100 within the PSE 150 (the "shadow substrate"). The local network manager(s) 154 can run on PSE 152 servers and bridge the shadow substrate with the customer's on-premise network, for example by acting as a VPN endpoint between the PSE 150 and the proxies 132, 134 provisioned in the cloud provider network 100, and by implementing the mapping service (for traffic encapsulation and decapsulation) to relate data plane traffic (from the DP proxies 134) and control plane traffic (from the CP proxies 132) to the appropriate droplet. By implementing a local version of the provider network's substrate-overlay mapping service, resources in the PSE 150 can seamlessly communicate with resources in the cloud provider network 100 region. In multi-rack PSEs 150, inter-rack communications can go through the local network managers 154, with local network managers 154 maintaining open tunnels to one another. The local network managers 154 may be collocated on the PSE servers 152, may run on a separate card of the PSE server 152 (e.g., an offload card), or can be installed as their own servers separate from the compute hosts. In some implementations, a single local network manager 154 can perform these actions for all hosts in the PSE 150. In other implementations, each host in the PSE 150 may have a dedicated local network manager 154.

PSEs 150 can require secure networking tunnels from the customer network to the cloud provider network 100 in order to operate, for example to maintain security of customer data when traversing an intermediate network, which may be the Internet. These tunnels are composed of virtual infrastructure components including VPCs, CP proxies 132 and DP proxies 134 (which may be implemented as containers running on compute instances), and substrate network interfaces. Every host in a PSE 150 can require at least two tunnels, one for CoAP control plane traffic and one for encapsulated data plane traffic. The connectivity manager 106 manages the cloud provider network 100 region-side lifecycle of these tunnels and their components, for example provisioning them automatically when needed and maintaining them in a healthy operating state.

A control plane (CP) proxy 132 can be provisioned in the cloud provider network 100 to represent particular host(s) in the PSE 150. A CP proxy 132 is an intermediary between the substrate in the cloud provider datacenter and the shadow substrate in the PSE 150. The CP proxy 132 maintains a VPN tunnel to a local network manager 154 in the PSE 150. CP proxies 132 can be implemented as compute instances that have a network interface in the substrate and an additional network interface in a VPC. CP proxies 132 can implement VPN tunnels back to the cloud provider network 100 region, instance traffic NATing to/from customer networks, and participate in the CoAP proxy path. CP proxies 132 provide infrastructure for tunneling management API traffic destined for PSE hosts out of the region substrate and to the remote PSE location. The software implemented within the CP proxies 132 ensures that only well-formed API traffic leaves from and returns to the substrate. CP proxies 132 provide a mechanism to expose remote devices (within a PSE 150 in a customer facility) on the cloud provider substrate, while still protecting substrate security materials (e.g., GIS keys, GTS tokens) from leaving cloud provider datacenters. The one-way control plane traffic tunnel imposed by the CP proxies also importantly prevents any (potentially compromised) devices from making calls back to the substrate. CP proxies 132 may be instantiated one-for-one with PSE servers 152, or may be able to manage control plane traffic for multiple PSE servers 152 in the same PSE 150.

A data plane (DP) proxy 134 can also be provisioned in the cloud provider network 100 to represent particular host(s) in the PSE 150. The DP proxy 134 acts as a shadow or anchor of the host, and can be used by services within the cloud provider network 100 to monitor health of the host (including its availability, used/free compute and capacity, used/free storage and capacity, and network bandwidth usage/availability). The DP proxy 134 also allows VPCs to span PSEs and a public region of the cloud provider network 100, by acting as a proxy for the PSE server 152 in the cloud provider network 100 region. Each DP proxy 134 can be implemented as a packet-forwarding compute instance or container. As illustrated, each DP proxy 134 can maintain a VPN tunnel with the local network manager 154 that manages the PSE server 152 that the DP proxy 134 represents. This tunnel can be used to send data plane traffic between the PSE 150 and the cloud provider network 100 region. Data plane traffic flowing between the PSE 150 and the cloud provider substrate can be passed through DP proxies 134 associated with that PSE 150. For data plane traffic flowing from the PSE 150 to the cloud provider substrate, DP proxies 134 can receive encapsulated data plane traffic, validate it for correctness, and allow it to enter into the substrate network. DP proxies 134 can forward encapsulated traffic from the cloud provider substrate directly to the PSE 150. If a DP proxy 134 receives any control plane traffic from the PSE 150, it will drop the traffic so that it does not enter the substrate. Regarding control plane traffic flowing from the region to the PSE 150, DP proxies 134 can delegate non-encapsulated traffic (e.g., control plane traffic) to the appropriate CP proxy 132 based on substrate IP address. Beneficially, this enforces the one-way secure tunnel between the CP proxies 132 and the local network manager 154 for control plane traffic, protecting the cloud provider network 100 against any potentially malicious control traffic flowing in from a PSE 150, but still allowing the customer to send control signals into the PSE 150 via the cloud provider substrate (e.g., to provision VMs 166 in the PSE 150, create volumes 168 in the PSE 150, attach these VMs 166 to these volumes 168, to deprovision any resources in the PSE 150, and to configure networking for PSE resources).

In at least some embodiments, a local network manager 154 may initiate the automated establishment of (or at least participate in the automated establishment of) secure network connectivity with the proxies 132, 134 established at one or more provider network data centers. After connectivity has been established between the local network manager 154 and the proxies 132, 134 at the provider network data center(s), the customer may issue commands to instantiate virtual machines (and/or perform other operations using virtual machines) that use PSE resources, in a manner analogous to the way in which such commands would be issued with respect to virtual machines that use only provider network resources. From the perspective of the customer, the functionality of the cloud provider network 100 may now seamlessly be utilized using local resources within the PSE 150 (as well as resources located in the provider network data centers, if desired). The VMs 166 set up on a PSE server 152 at the provider substrate extension 150 may communicate (e.g., with the help of the network manager 154, which may perform address translation and/or other encapsulation protocol-related processing) both with customer devices 160 located on the customer's computing network in various embodiments, as well as with other VMs that are set up in the provider network data centers, as desired.

A local gateway 158 can be implemented to provide network connectivity between resources running on the PSE servers 152 and customer devices 160 on the customer's network, in order to take advantage of the reduced latency and other benefits of having cloud provider hardware installed in the customer network. The customer can configure the local gateway 158 by issuing API calls to an interface of the cloud provider network 100 which results in control plane commands being sent to the PSE 150. The customer can establish communications between instances hosted by the PSE 150 and the customer devices 160 via the local gateway 158. The local customer devices 160 can include any on-premise or mobile devices that have access to the customer network, for example robotic devices, manufacturing devices, medical equipment, mobile phones, or other computing devices on the customer network.

There may be circumstances that necessitate the transfer of data between the object storage service in the cloud provider network 100 and the PSE 150. For example, the object storage service may store machine images used to launch VMs 166, as well as snapshots representing point-in-time backups of volumes 168. The object gateway 156 can be a provider on a PSE server 152 or a specialized storage device, and provides customers with configurable, per-bucket caching of object storage bucket contents in their PSE 150 to minimize the impact of PSE-region latency on the customer's workloads. The object gateway 156 can also temporarily store snapshot data from snapshots of volumes in the PSE 150 and then sync with the object store servers 126 in the region when possible. The object gateway 156 can also store machine images that the customer designates for use within the PSE 150 or on the customer's premises.

In the manner described above, the PSE 150 forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity managed by the cloud provider but provided outside of a traditional availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a far zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

In some implementations, the data within the cloud provider network 100 and/or a PSE 150 may be encrypted. For example, a snapshot of a volume managed by a block store server 124 in the cloud provider network 100, or a snapshot of a volume 168 in the PSE 150, may be encrypted before storage for security reasons. In some embodiments, the encrypted data, whether encrypted volume snapshots or other data sets, may be stored as encrypted data objects, such as in an object store server 126 or PSE bucket 110 within the cloud provider network 100, or in the object gateway 156 or an object bucket (not shown) within the PSE 150. Accordingly, data exchanged between the object store servers 126 and block store servers 124, and between the object store servers 126 and the PSE 150 (e.g., via the object gateway 156 and/or a virtualized block storage service on a PSE server 152 without necessarily using an object gateway 156) may require encryption and decryption.

A multi-envelope cryptography system 180 may be implemented to manage the encryption and decryption process, and to ensure durability and security of the cryptographic keys (also referred to as "data keys") used to encrypt and decrypt the data sets. Advantageously, the multi-envelope cryptography system 180 may not only handle the encryption and decryption of data sets used by various data plane components 104 and 162, but may also encrypt the data keys into encryption envelopes, and manage the storage, access, and decryption of the encryption envelopes to recover the encrypted data keys.

In some embodiments, as shown, the PSE snapshot manager 108 can implement the functionality of the multi-envelope cryptography system 180.

Example Multi-Envelope Encryption Process

Figure 2:
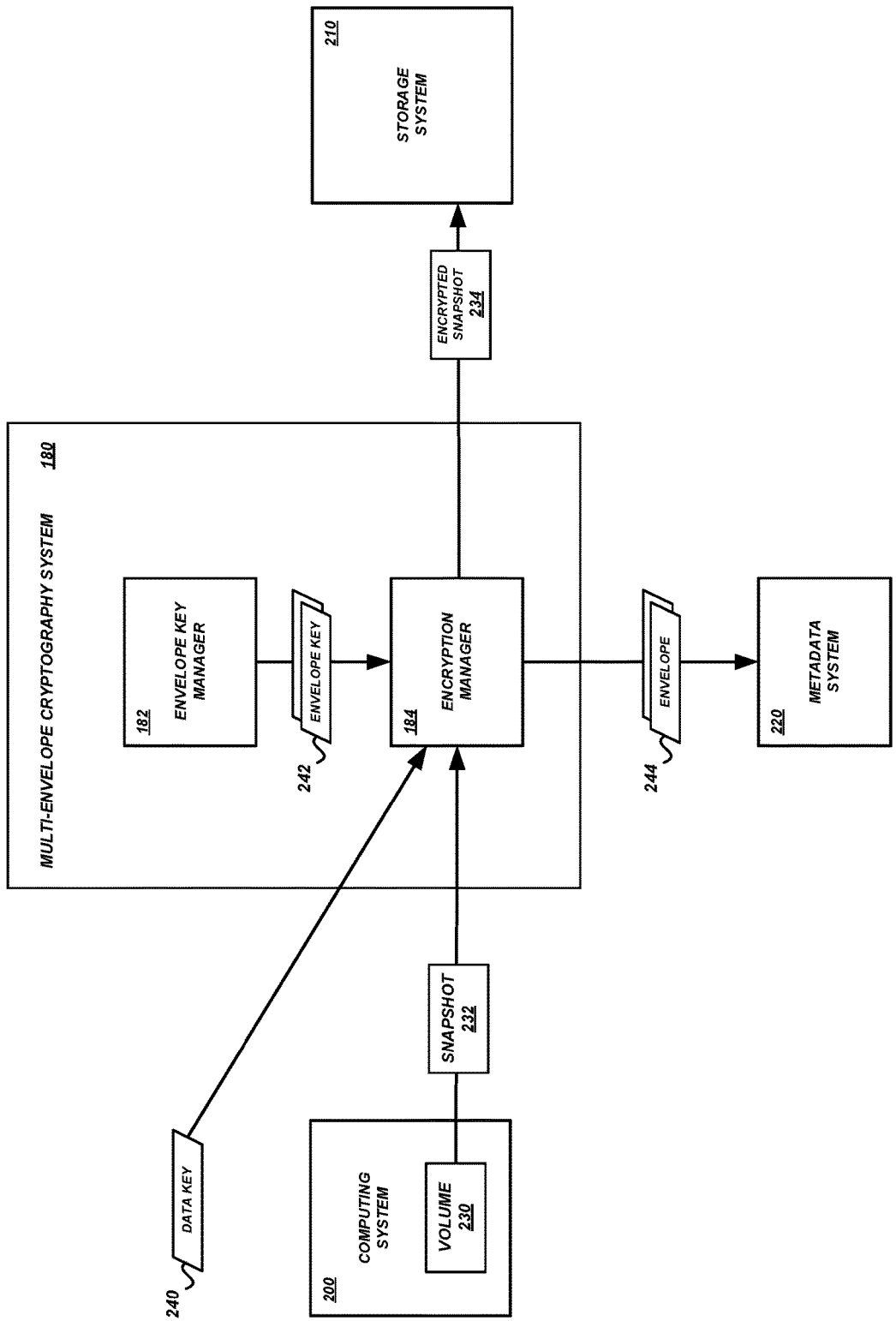
FIG. 2 is a block diagram of illustrative data flows and interactions between components of the cloud provider network during encryption of data according to some embodiments.

FIG. 2 shows example data flows and interactions between a multi-envelope cryptography system 180, a computing system 200 that is the source of data to be encrypted, a storage system 210 in which encrypted data is to be stored, and a metadata storage system 220 in which encryption envelopes are stored. Illustratively, the example interactions and data flows occur during an encryption operation.

The multi-envelope cryptography system ("MECS") 180 may include various subsystems, modules, and/or components to provide the functionality described herein. In some embodiments, the MECS 180 may include an envelope key manager 182 for maintaining a set of envelope keys used by the MECS 180. For example, the envelope key manager 182 may store the envelope keys, manage access to modify groups of envelope keys or individual envelope keys, and provide access the envelope keys. In some embodiments, the MECS 180 may include an encryption manager 184 for encrypting and/or decrypting data using data keys, encrypting and/or decrypting the data keys using envelope keys, and the like. The MECS 180 and/or the individual components thereof may be implemented using one or more computing devices that include computer processors configured to execute specific instructions stored in memory.

The computing system 200 may be a computing system that has data to be encrypted for storage using the MECS 180. Illustratively, the computing system 200 may be a data plane component 140 or 162, shown in FIG. 1. For example, the computing system 200 may in some embodiments be or include a block store server 124 that stores data volumes used by other computing systems, such as a compute server 122 within a cloud provider network 100. As another example, the computing system 200 may be a data plane component 162 in a PSE 150 with one or more volumes 168 to be stored securely.

The storage system 210 may in some embodiments be or include an object store server 126 that stores snapshots of data volumes maintained by a block store server 124, snapshots of data volumes 168 maintained by data plane components 162 of a PSE 150, or other user data sets. For example, as described in greater detail below, encrypted snapshots and/or encrypted versions of other data sets may be stored in the storage system 210 for later access.

The metadata storage system 220 may in some embodiments be or include an object store server 126 that stores metadata associated with encrypted snapshots of data volumes or other encrypted data sets stored in the storage system 210.

Although some examples are described herein with respect to the MECS 180, computing system 200, storage system 210, and metadata storage system 220 being subsystems or other components of a cloud provider network 100 and/or PSE 150, the examples are illustrative only and are not intended to be limiting. In some embodiments, the MECS 180 may be used in other environments, such as an on-premise network environment of a business, university, or other entity, with or without access to a cloud provider.

In some embodiments, the services of the MECS 180 may be provided by a cloud provider for encryption and management of data that may or may not be stored in or consumed by resources within the same cloud provider, and that may or may not be stored within a PSE 150 of a cloud provider network 100 in which the MECS 180 is implemented. For example, the MECS 180 may be a managed service that receives input data to be encrypted, generates an encrypted version of the input data for secure storage, generates multiple encryption envelopes for later access to decrypt the encrypted version of input data, and subsequently manages the decryption of the encryption envelopes and the encrypted data on behalf of users. The MECS 180 may in some embodiments perform these actions regardless of whether the source and/or destination of encrypted and/or decrypted data is within the same cloud provider network as the MECS 180.

Figure 3:
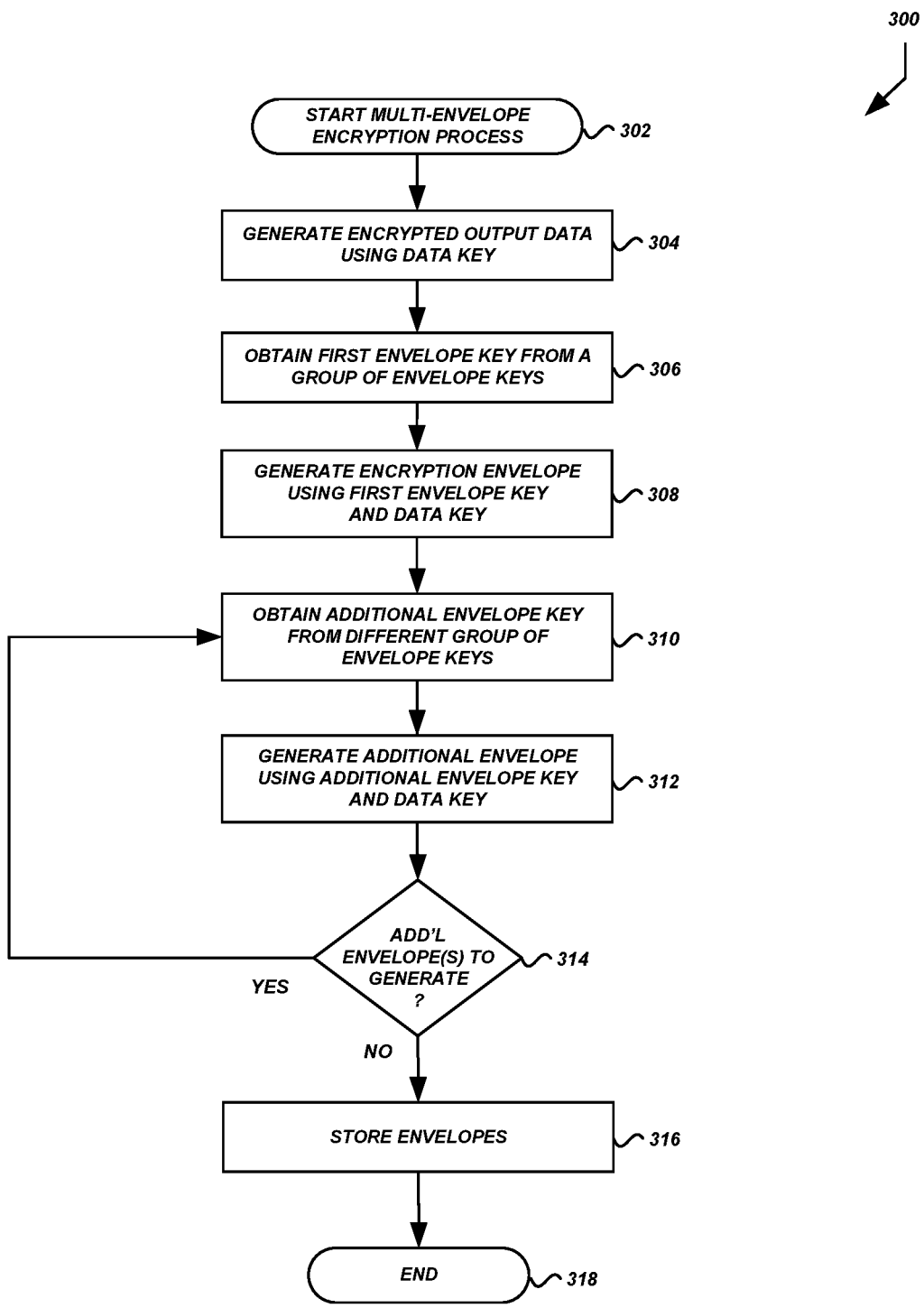
FIG. 3 is a flow diagram of an illustrative process for managing encryption of data and generation of multiple encryption key envelopes according to some embodiments.

The example interactions between the MECS 180 and other systems shown in FIG. 2 will be described with further reference to the process 300 shown in FIG. 3. Advantageously, the process 300 includes operations and features that allow for generation of multiple encryption envelopes associated with a snapshot or other user data set that is encrypted. As described in greater detail below, generation and storage of multiple encryption envelopes can help to reduce or eliminate the likelihood of data loss due to the unavailability of an envelope encryption key.

The process 300 beings at block 302. In some embodiments, the process 300 may begin when the MECS 180 receives a request to encrypt a data set. For example, the MECS 180 may receive a request to encrypt a snapshot 232 of a data volume 230 used by computing system 200.

At block 304, the MECS 180 can generate encrypted output using an input data set and a cryptographic key. In some embodiments, the encryption manager 184 can generate an encrypted version of snapshot 232, such as encrypted snapshot 234, using a data key 240 and an encryption algorithm. For example, the encryption algorithm may be Advanced Encryption Standard ("AES"), Triple Data Encryption Standard ("Triple DES"), Blowfish, Twofish, Rivest-Shamir-Adleman ("RSA"), or some other algorithm. The MECS 180 may send the encrypted snapshot 234 (or other encrypted data set) to a storage system 210 to be securely stored in encrypted form for future access.

The data key 240 used to encrypt the snapshot 232 (or other data set) may be obtained in any number of different ways. In some embodiments, the data key 240 may be provided with the input to be encrypted. In some embodiments, the encryption manager 184 or some other entity may generate the data key 240 specifically for use in encrypting the input, such as by using a pseudo-random number generator to generate a seed from which the data key 240 can be derived. For example, the MECS 180 may use AES-256 XTS encryption in which the data key 240 is a 64-byte symmetric key. The 64-byte length allows $2^{512}$ unique binary representations. Thus, even if a new data key 240 is generated for each data set in a high-volume secure storage system, each data key 240 may nevertheless be unique or substantially unique (e.g., statistically unique for practical purposes).

At block 306, the MECS 180 can obtain a first envelope key 242 to generate a first encryption envelope for secure storage of the data key 240. The envelope key 242 may be one of a plurality of envelope keys maintained by or otherwise available to the MECS 180. For example, the envelope key manager 182 may manage a set of envelope keys used to generate all or substantially all envelopes of the MECS 180. The set of envelope keys may be segregated into two or more groups of envelope keys. For example, there may be 50 envelope keys segregated into 5 groups of 10 keys each, whereby each individual envelope key is a member of one and only one of the 5 groups. The segregation between groups may be enforced to ensure that the failure domain for individual envelope keys or groups of envelope keys is different than the failure domain for other envelope keys or groups of keys.

To obtain the first envelope key 242, the encryption manager 184 may randomly select an envelope key group for a given request, and may then request that the envelope key manager 182 provide an envelope key in the randomly selected group. In some embodiments, the encryption manager 184 may use other selection algorithms, such as a round-robin algorithm to request an envelope key from each envelope key group once before requesting a second envelope key from any envelope key group, and so on.

The envelope key manager 182 may select an envelope key from the indicated envelope key group (e.g., using pseudo-random selection, round robin selection, or some other selection algorithm). In some embodiments, instead of the encryption manager 184 managing selection of envelope key groups, the envelope key manager 182 may manage selection of envelope key groups and also the selection of individual envelope keys from the key groups (e.g., using pseudo-random selection, round robin selection, or some other selection algorithm).

At block 308, the encryption manager 184 may generate an encryption envelope 244 using the first envelope key 242 obtained above and the data key 240 used above to generate the encrypted output. The envelope 244 may include an encrypted version of the data key 240. In some embodiments, the encryption envelope 244 may include other data (e.g., "key material") to be used in encrypting and/or decrypting data using the envelope key. To encrypt the data key 240 (and any other data to be included in the encryption envelope 244), the encryption manager 184 may use an encryption algorithm such as AES, Triple DES, Blowfish, Twofish, RSA, or some other algorithm. In some embodiments, the encryption envelope 244 may be generated based further on other data, such as account credentials associated with the account requesting encrypted storage of the data set. In this way, the encryption envelope 244 will only be able to be decrypted later—and the data key 240 recovered—if both the proper user account and proper envelope key 242 are used.

At block 310, the MECS 180 can obtain an additional envelope key 242 to generate an additional encryption envelope 244 for secure storage of the data key 240. The additional envelope key 242 may be selected from a different envelope key group than the first envelope key 242 selected above (and different than the other additional key(s) selected in the current instance of the process 300). To obtain the additional envelope key 242, the encryption manager 184 may randomly select an envelope key group for a given request and, provided the envelope key group is different than all other envelope key groups in the current instance of the process 300, the encryption manager 184 may then request that the envelope key manager 182 provide an envelope key 242 in the randomly selected group. In some embodiments, the encryption manager 184 may use other selection algorithms, such as a round-robin algorithm to request an envelope key from 242 a next envelope key group in a sequence. In some embodiments, the envelope key manager 182 may manage selection of both envelope key groups and individual envelope keys 242 from the key groups (e.g., using pseudo-random selection, round robin selection, or some other selection algorithm), provided the key groups are different for each envelope key 242 selected in a particular instance of the process 300.

At block 312, the encryption manager 184 may generate an additional encryption envelope 244 using the additional envelope key 242 obtained above and the data key 240 used above to generate the encrypted output. The additional envelope may include an additional encrypted version of the data key 240 that is different than each other encrypted version of the data key 240 generated during the current instance of the process 300. In some embodiments, the additional encryption envelope 244 may include other data (e.g., "key material") to be used in encrypting and/or decrypting data using the data key 240.

At decision block 314, the encryption manager 184 can determine whether to generate any additional encryption envelopes. In some embodiments, two encryption envelopes may be created during an instance of the process 300, and the process 300 may then proceed to block 314. In some embodiments, three or more encryption envelopes may be created, and the process 300 may return to block 310 as needed to generate the additional encryption envelopes. In some embodiments, a variable number of encryption envelopes may be generated during different instances of the process 300. For example, the number of encryption envelopes may be randomly determined on an instance by instances basis. As another example, the number of encryption envelopes may be configurable or based one or more dynamic criteria, such as the size of the input data to be encrypted, the sensitively of the input data to be encrypted, a service level agreement, or the like.

At block 316, the encryption manager 184 can store the encryption envelopes 244 for future use in decrypting the encrypted data set. In some embodiments the encryption envelopes 244 may be stored in a separate data store than the encrypted data set. For example, the encryption envelopes 244 may be stored in a metadata store 220 that is separate from the storage system 210 in which the encrypted snapshot 234 is stored.

The process 300 may terminate at block 318.

Example Multi-Envelope Decryption Process

Figure 4:
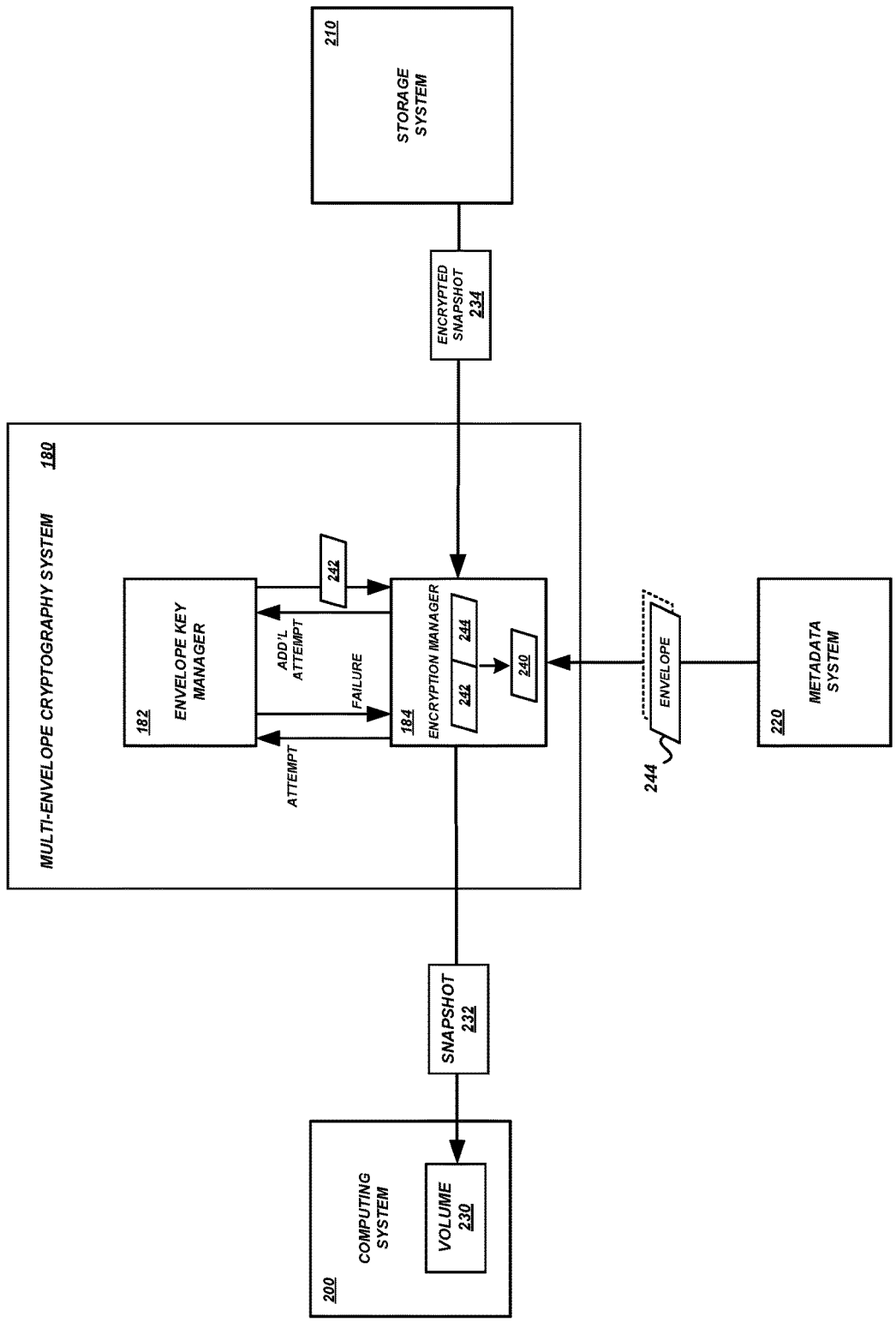
FIG. 4 is a block diagram of illustrative data flows and interactions between components of the cloud provider network during decryption of data according to some embodiments.

FIG. 4 shows example data flows and interactions between an MECS 180, a storage system 210 in which an encrypted data set is stored, a computing system 200 that is to receive a decrypted version of the encrypted data set, and a metadata storage system 220 in which encryption envelopes for decrypting encrypted data sets are stored. Illustratively, the example data flows and interactions occur during a multi-envelope decryption process.

Figure 5:
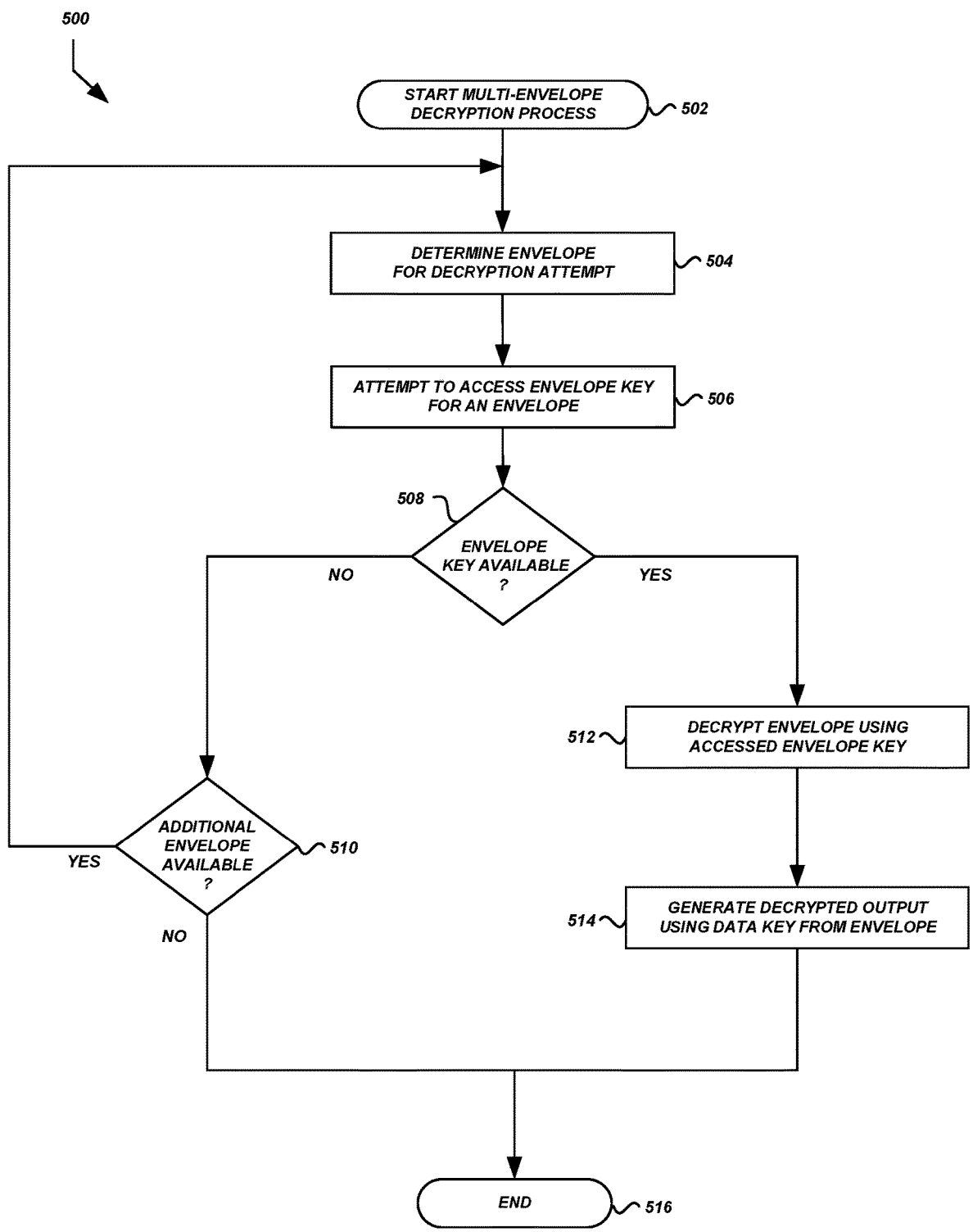
FIG. 5 is a flow diagram of an illustrative process for managing decryption of data using multiple encryption key envelopes according to some embodiments.

The example interactions between the MECS 180 and other systems shown in FIG. 4 will be described with further reference to the process 500 shown in FIG. 5. Advantageously, the process 500 includes operations and features that allow for use of multiple encryption envelopes associated with a snapshot or other user data set that is encrypted. If the envelope key for an encryption envelope is unavailable, the process 500 provides automatic failover to second and/or additional encryption envelopes to obtain the data key for decrypting the data set. As described in greater detail below, the use of—and automatic failover facilitated by—multiple encryption envelopes can help to reduce or eliminate the likelihood of data loss due to the unavailability of an envelope encryption key.

The process 500 beings at block 502. In some embodiments, the process 500 may begin when the MECS 180 receives a request to access a data set that is stored in encrypted form. For example, the MECS 180 may receive a request in connection with restoration of a data volume 230 from an encrypted snapshot 234.

At block 504, the MECS 180 can determine a first encryption envelope of the multiple encryption envelopes associated with the encrypted data set. In some embodiments, the metadata storage system 220 may store data that identifies the encryption envelopes associated with encrypted data sets stored in the storage system 210. A request to obtain access to an encrypted data set may include data identifying the encrypted data set, such as a unique identifier, a path, or the like. For example, if the encrypted data set is an encrypted snapshot 234, the MECS 180 may obtain the encrypted snapshot 234 from the storage system 210 using the identifier, path, or other identifying data provided in the request. The MECS 180 may also obtain, from the metadata storage system 220, the encryption envelopes 244 or data identifying the encryption envelopes 244 associated with the encrypted snapshot 234. The encryption envelopes 244 may be obtained using the same identifying information that is used to obtain the encrypted snapshot 234, identifying information stored with the encrypted snapshot 234, or identifying information otherwise derived from the request or encrypted snapshot 234 or accessed from some other source.

The MECS 180 may determine which encryption envelope 244 to attempt to decrypt first based on data associated with the encryption envelopes 244, the encrypted snapshot 234, or the like. For example, the encryption envelopes 244 may be pre-numbered or prioritized in some other manner (e.g., via data representing a pre-set ordered listing) such that a particular encryption envelope 244 is indicated as the primary or first encryption envelope to be used.

In some embodiments, the MECS 180 may determine which encryption envelope to attempt to decrypt first based on a dynamic selection algorithm rather than a preset order. For example, the MECS 180 may use a randomized selection algorithm (e.g., based on a pseudo-random number generator) to select an encryption envelope from the set of encryption envelopes associated with the encrypted data set. As another example, the MECS 180 may use a round robin selection algorithm in which each time the encrypted data set is accessed, a different encryption envelope is selected as the first encryption envelope to attempt to decrypt until each of the encryption envelopes associated with the encrypted data set has been selected first.

The example methods of selecting an encryption envelope to attempt to decrypt first are illustrative only, and are not intended to be limiting. In some embodiments, additional and/or alternative methods may be used, alone or in combination.

At block 506, the MECS 180 can attempt to access the envelope key 242 that is used to decrypt the first encryption envelope 244. In some embodiments, the encryption manger 184 can request the envelope key 242 from the envelope key manager 182. The envelope key 242 may be requested using an identifier. For example, there may be an identifier of the envelope key 242 in the metadata associated with the encrypted data set, in metadata associated with the envelope 244, or the like.

At decision block 508, the MECS 180 can determine whether the envelope key 242 is available. In some embodiments, the envelope key manager 182 may access a data store in which the set of envelope keys is stored. The envelope key manager 182 may retrieve the requested envelope key if it is available (e.g., if it is present in the data store, if access policies permit access, etc.). If the key is available and successfully retrieved, the process 500 may proceed to block 512. Otherwise, if the key is unavailable or otherwise not successfully obtained, the process 500 may proceed to decision block 510.

At decision block 510, the MECS 180 can determine the next encryption envelope to access (or attempt to access) after a failure to successfully access envelope keys for the first envelope (and all other prior envelopes) in the current instance of the process 500. If there is another encryption envelope to attempt to decrypt, the process 500 may return to block 504 to determine the envelope to attempt to decrypt next. Otherwise, if there are no other encryption envelopes to attempt to decrypt, then the process 500 may terminate at block 516.

In returning to block 504 during a given instance of the process 500, the MECS 180 may determine which encryption envelope to attempt to decrypt next based on data associated with encryption envelopes 244, the encrypted snapshot 234, or the like. For example, the encryption envelopes 244 may be pre-numbered or prioritized in some other manner (e.g., via separate data representing a pre-set ordered listing) such that a particular encryption envelope 244 is indicated as the next encryption envelope to be used. In some embodiments, the MECS 180 may determine which encryption envelope to attempt to decrypt next based on a dynamic selection algorithm rather than a preset order. For example, the MECS 180 may use a randomized selection algorithm (e.g., based on a pseudo-random number generator) to select an encryption envelope from the set of encryption envelopes associated with the encrypted data set. As another example, the MECS 180 may use a round robin selection algorithm in which each time the encrypted data set is accessed, a different encryption envelope is selected as the encryption envelope to attempt to decrypt in the current iteration of block 504 until each of the encryption envelopes associated with the encrypted data set has been selected in the current iteration. The example methods of selecting an encryption envelope to attempt to decrypt next are illustrative only, and are not intended to be limiting. In some embodiments, additional and/or alternative methods may be used, alone or in combination.

At block 512, the MECS 180 can decrypt an encryption envelope using the envelope key that was successfully accessed above. Decryption may be performed using any of a variety of decryption algorithms (e.g., AES, Triple DES, Blowfish, Twofish, RSA, etc.), depending upon the algorithm that was used to encrypted the envelope. In some embodiments, additional information may be used to decrypt the encryption envelope, such as access credentials associated with a requesting user account. In this way, even if an envelope key for an encryption envelope associated with requested data is available, the encryption envelope may not be successfully decrypted unless the request comes from an authorized account.

In some embodiments, the encryption manager 184 obtains the envelope and envelope key, and performs decryption. Decryption of the envelope can be done to obtain a decrypted copy of the data key that will itself be used to decrypt the encrypted versions of the requested data set. In some embodiments, the envelope key manager 182 decrypts the envelope using the accessed envelope key, and provides the decrypted payload—the decrypted copy of the data key—to the encryption manager 184.

At block 514, the MECS 180 can generate decrypted output data using the data key, obtained above, and the encrypted data set. In some embodiments, the encryption manager 184 can execute a decryption algorithm (e.g., AES, Triple DES, Blowfish, Twofish, RSA, etc.), depending upon the particular algorithm that was previously used to encrypt the data set, in order to obtain the decrypted data set using the data key. The MECS 180 may then provide the decrypted data set to the requesting system. For example, the MECS 180 may provide a decrypted snapshot 232 to a computing system 200 or otherwise make the decrypted snapshot 232 available for restoring a volume to the computing system 200.

The process 500 may terminate at block 516.

Example Envelope Key Management Process

Figure 6:
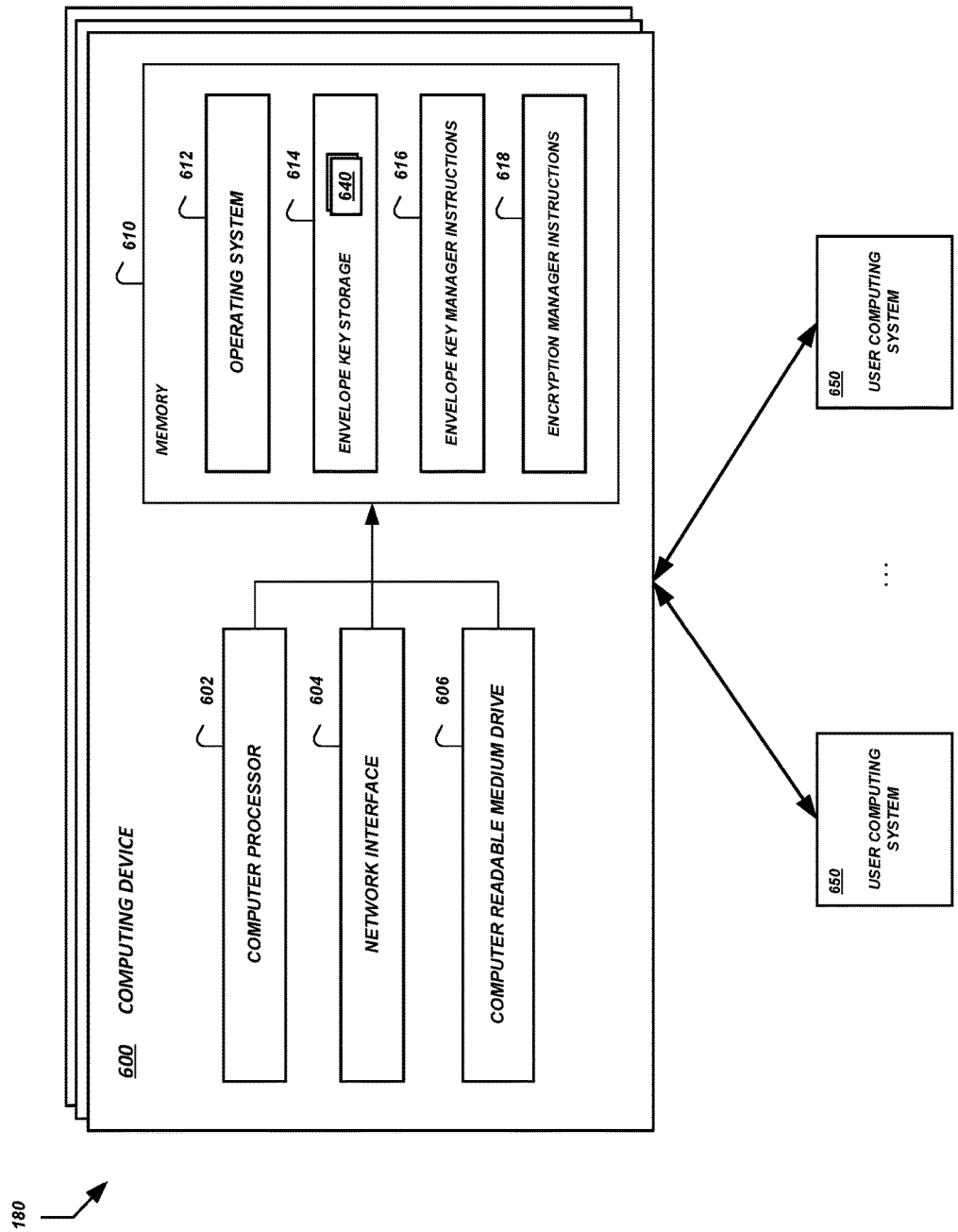
FIG. 6 is a block diagram of an illustrative computing device configured to implement features of a multi-envelope cryptography system according to some embodiments

FIG. 6 illustrates various components of an example computing device 600 configured to implement various functionality of the multi-envelope cryptography system 180. As shown, a multi-envelope cryptography system 180 may include one or more of such computing devices 600. In some embodiments, each individual computing device 600 is configured to provide all of the features of the MECS 180. In some embodiments, a particular computing device 600 provides only a subset of features of the MECS 180. For example, one computing device 600 or subset of computing devices may implement the features of the envelope key manager 182, a second computing device 600 or subset of computing devices may implement the features of the encryption manager 184, etc.

In some embodiments, as shown, the computing device 600 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SDDs"), flash drives, and/or other persistent non-transitory computer-readable media; and one or more computer readable memories 610, such as random access memory ("RAM") and/or other volatile non-transitory computer-readable media.

The computer readable memory 610 may include computer program instructions that one or more computer processors 602 execute in order to implement one or more embodiments. The computer readable memory 610 can store an operating system 612 that provides computer program instructions for use by the computer processor(s) 602 in the general administration and operation of the computing device 600. In some embodiments, the computer readable memory 610 can further include computer program instructions and other information for implementing aspects of the present disclosure. For example, in one embodiment, the computer-readable memory 610 may include envelope key storage 614 for storing envelope keys 242. In some embodiments, as shown, the envelope keys 242 may be segregated into two or more key groups 640. The computer-readable memory 610 may in some embodiments include one or more of: envelope key manager instructions 616 for implementing features of the envelope key manager 182, encryption manager instructions 618 for implementing features of the encryption manager 184, etc.

FIG. 6 further illustrates example data flows and interactions between the MECS 180 and one or more user computing systems 650 configured to manage envelope keys via the MECS 180. The example interactions between the MECS 180 and user computing systems 650 shown in FIG. 6 will be described with further reference to the process 700 shown in FIG. 7. Advantageously, the process 700 includes operations and features that allow for secure, durable management of envelope keys by segregating the envelope keys in to multiple key groups, preventing access by a single user account to multiple key groups, and execution of verification workflows prior to committing a modification to an envelope key, key group, or policy affecting envelope keys, and prior to allowing modifications to other envelope keys, key groups, or policies affecting other envelope keys.

When processes 300, 500, or 700 are initiated, a corresponding set of executable program instructions stored on a computer readable medium drive 606 may be loaded into computer readable memory 610 and executed by one or more computer processors 602. In some embodiments, the processes 300, 500, and 700—or portions thereof—may be implemented on multiple computing devices and/or multiple processors, serially or in parallel.

Process 702 may start at block 702. In some embodiments, the process 700 may begin when the MECS 180 receives a request to modify the set of envelope keys 242. For example, the MECS 180 may receive a request from a first user computing system 650 to add a new envelope key 242 to set of envelope keys, modify an envelope key 242 or a policy applicable thereto, retire an envelope key 242 from the set of envelope keys, alter the segregation of envelope keys into fewer, additional, or different key groups 640, or perform some other operation that may affect the set of envelope keys or any individual envelope key 242.

In some embodiments, each user account that is able to request modifications to the set of envelope keys is authorized only for a single key group 640. A user account will be blocked from making modifications to envelope keys 242 outside of its authorized key group 640. In this way, a single user account is prevented from make a change that could cause the loss of multiple envelope keys associated with a single encrypted data set, as long as the encrypted data set is associated with envelopes encrypted using envelope keys from multiple different envelope key groups. This security measure therefore improves durability and reduces the likelihood that an encrypted data set will become unrecoverable due to loss of all envelope keys for the encryption envelopes generated for the encrypted data set.

At block 704, the MECS 180 can lock the set of envelope keys from further modifications while the currently-requested modification is applied, tested, and ultimately validated or rejected. Locking the set of envelope keys may include setting a flag or other system parameter that is evaluated before attempting any modification affecting the set of envelope keys. Setting the parameter to a particular value may therefore cause the set of envelope keys to be set in a locked state with respect to any modification other than modification that is processed in the current instance of process 700.

Figure 7:
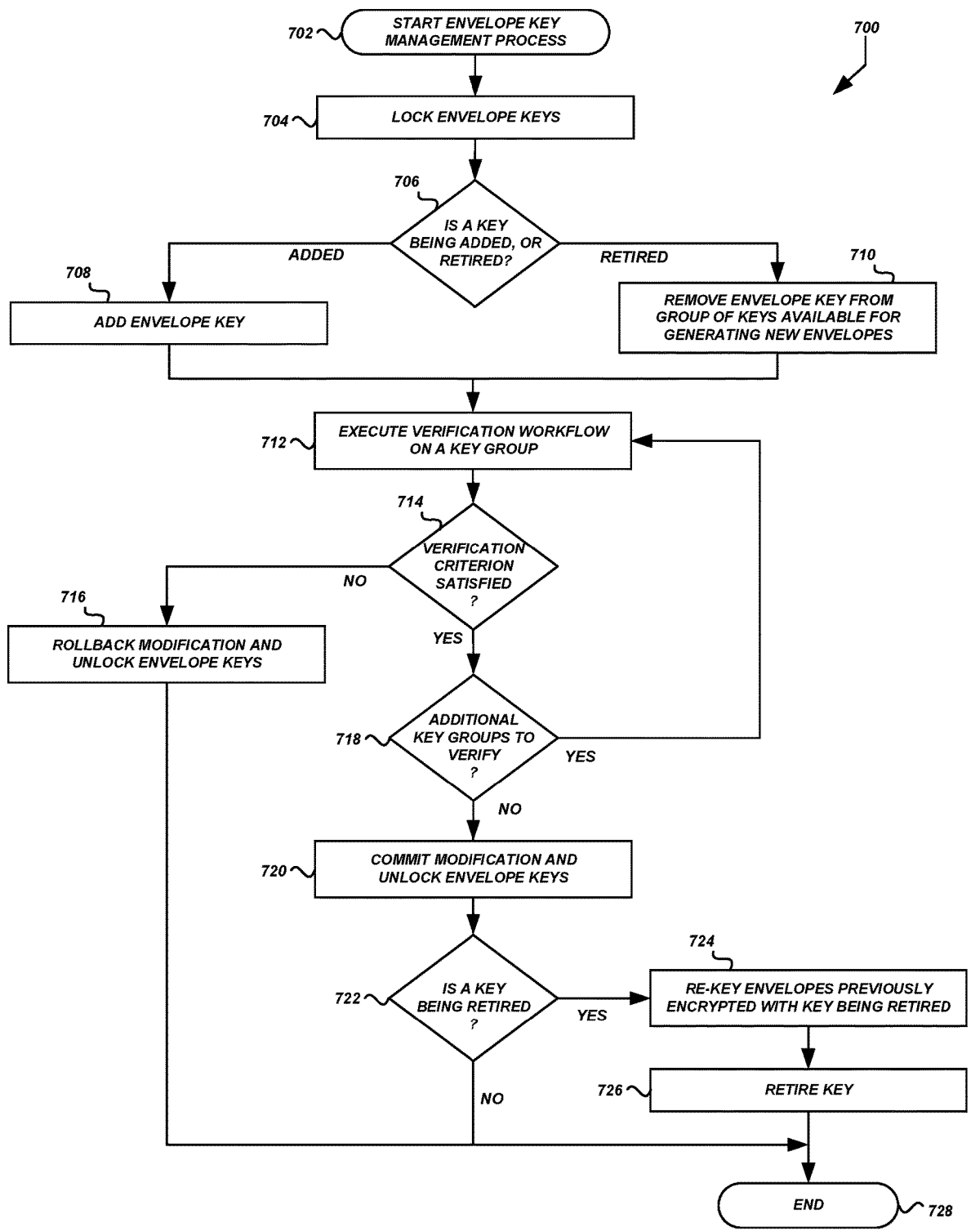
FIG. 7 is a flow diagram of an illustrative process for managing envelope encryption keys according to some embodiments.

At decision block 706, the MECS 180 can determine the modification that has been requested. FIG. 7 illustrates example modifications that may be handled by the MECS 180, including: addition of a new envelope key 242 at block 708, and retirement of an envelope key 242 at block 710. In some embodiments, only one modification may be made per instance of process 700.

At block 708, the MECS 180 may add a new envelope key 242 to the set of envelope keys. This may be done during initial system set up or expand the set of keys. In some cases, a new envelope key may be added as system volume increases and the blast radius of individual keys grows (e.g., once the blast radius, as indicated by then number of encryption envelopes encrypted using a single envelope key, exceeds a threshold).

At block 710, the MECS 180 may begin a process to remove or "retire" an envelope key from use. This may be done, for example, if the envelope key has become compromised. As another example, this may be done if replacement keys are being added, such as longer or otherwise more secure keys, when the encryption algorithm is changed, etc. As a further example, an envelope key may be retired if a user associated with the envelope key is no longer permitted to access data associated with encryption envelope generated using the envelope key. By retiring the envelope key, any attempt to access the key to decrypt an encryption envelope will fail.

In some embodiments, retirement of an envelope key can involve setting the envelope key into one or more intermediate states until the envelope key is fully retired. For example, when a request to retire an envelope key is received, the envelope key may be in an active state in which the envelope key is available for generating new encryption envelopes (e.g., new encrypted versions of data keys for data sets being encrypted and stored) and also available for decrypting existing encryption envelopes (e.g., data keys that were previously encrypted using the envelope key). The request to retire the envelope key may therefore be a request to ultimately set the envelope key in a retired state in which the envelope key is both unavailable for generating new encryption envelopes and also unavailable for decrypting existing encrypting envelopes. However, rather than moving directly from the active state to the retired state, there may be one or more intervening operations to be performed. For example, any existing encryption envelopes generated using the envelope key may be replaced with encryption envelopes generated using envelope keys that will remain in the active state. This process may be referred to as "re-keying," as described in greater detail below. To prevent any new encryption envelopes from being generated using the envelope key during the re-keying process, the envelope key may be set in an intermediate state, such as a first unavailable state or a "removed" state. In this intermediate state, the envelope key is unavailable for generating new encryption envelopes but remains available for decrypting existing encryption envelopes previously encrypted using the envelope key.

As another example of a modification that may be implemented, the MECS 180 may modify an envelope key group 640. For example, a new envelope key group 640 may be generated. This may be done to have a larger number of envelope key groups from which keys may be selected and encryption envelopes generated. As another example, an envelope key group 640 may be removed. This may be done to retire a group of keys all at once rather than one at a time.

The example envelope key modifications described herein are illustrative only and are not intended to be limiting, required, or exhaustive of the modifications that may be implemented. In some embodiments, fewer, additional, and/or alternative modifications may be implemented.

At block 712, the MECS 180 can execute a post modification verification workflow to verify that the modification does not cause negative or otherwise unintended effects. In some embodiments, the verification workflow may be performed first on the envelope key group 640 that was immediately affected by the modification. The verification workflow may include one or more of: generating a new encryption envelope and decrypting the encryption envelope to verify its contents; decrypting an existing encryption envelope that was generated using the envelope key that has been modified in the current instance of the process 700 and/or by other envelope keys in the envelope key group; executing an envelope key selection algorithm a statistically significant number of times to ensure an expected rate of selection of the envelope key that has been modified in the current instance of the process 700 and/or other envelope keys in the envelope key group; and/or other verification operations.

At decision block 714, the MECS 180 can evaluate a verification criterion, such as whether the verification workflow has resulted in verification that the envelope key modification has not caused negative or otherwise unexpected effects. If the verification criterion is not satisfied or the modification does not otherwise pass the verification workflow, the process 700 may proceed to block 716 where the modification is rolled back and the envelope key set is returned to the same state as before the current instance of the process 700. If the modification passes the verification workflow, the process 700 may proceed to decision block 718.

At decision block 718, the MECS 180 can determine whether there are additional envelope key groups 640 on which the verification workflow is to be run. In some embodiments, this may include each remaining envelope key group of the envelope key set, even if no modification was made directly to or otherwise intended to affect an envelope key in the envelope key group. The process 700 may return to block 712 for any remaining envelope key group. If there are no remaining envelope key groups against which the verification workflow is to be executed, the process 700 may proceed to block 720.

At block 720, the modification that was made during the current instance of the process 700 may be committed, and the envelope key set may be returned to an unlocked state so that future modification requests may be processed.

At decision block 722, the MECS 180 can determine whether a key is being retired in the current instance of process 700 and, if so, perform additional operations beginning at block 724. Otherwise, if no key is being retired or there are otherwise no additional operations to be performed after the verification workflow, the process 700 may terminate at block 728.

At block 724, the MECS 180 may re-key envelopes previously encrypted with the key being retired. The MECS 180 may analyze the metadata associated with the encrypted data sets and identify any envelopes encrypted using the key being retired. For example, the MECS 180 may analyze envelope key identifier data to identify any envelopes encrypted using an envelope key with the identifier of the key being retired. The MECS 180 may then decrypt those envelopes using the envelope key being retired, recover the data key, and generate new encryption envelopes using a different envelope key. In some embodiments, a single key may be used to re-key all envelopes previously encrypted with the key being retired. In some embodiments, a selection algorithm may be used to select different keys for re-keying different subsets of the envelopes previously encrypted with the key being retired (e.g., a round-robin selection algorithm, a pseudo-random selection algorithm, etc.).

At block 726, once the envelopes previously encrypted with the key being retired have been re-keyed using one or more keys that are still active (e.g., using keys that have not been retired and are not currently being retired), the MECS 180 may complete the process of retiring the envelope key 726. In some embodiments, the envelope key 726 may be set in a second unavailable or "retired" state in which the envelope key is both unavailable for generating new encryption envelopes and also unavailable for decrypting existing encrypting envelope. For example, the envelope key 726 may be deleted or otherwise removed from the MECS 180 such that the envelope key 726 is no longer available for creating new envelopes and no longer available for decrypting existing envelopes. The process 700 may then terminate at block 728.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:
1. A system comprising:
computer-readable memory storing executable instructions; and
one or more computer processors configured by the executable instructions to at least:

generate an encrypted snapshot of a data volume using a cryptographic data key, wherein the data volume is one of a plurality of data volumes of a cloud computing system;

store the encrypted snapshot in a first data store;

obtain a first cryptographic envelope key of a first group of cryptographic envelope keys;

generate, using the first cryptographic envelope key, a first encryption envelope comprising a first encrypted version of the cryptographic data key;

obtain a second cryptographic envelope key of a second group of cryptographic envelope keys, wherein the second group is different than the first group;

generate, using the second cryptographic envelope key, a second encryption envelope comprising a second encrypted version of the cryptographic data key;

store the first encryption envelope and the second encryption envelope in a second data store;

receive, from the cloud computing system, a request to restore the data volume from the encrypted snapshot;

generate a first request to access the first cryptographic envelope key;

determine that the first cryptographic envelope key is unavailable;

in response to determining that the first cryptographic envelope key is unavailable, generate a second request to access the second cryptographic envelope key;

obtain access to the second cryptographic envelope key;

decrypt the second encryption envelope using the second cryptographic envelope key to obtain the cryptographic data key;

generate a decrypted snapshot of the data volume using the cryptographic data key and the encrypted snapshot;

provide the decrypted snapshot to the cloud computing system;

receive a request to retire the second cryptographic envelope key;

set the second cryptographic envelope key in an intermediate state wherein the second cryptographic envelope key is unavailable to generate encryption envelopes;

generate, using a third cryptographic envelope key and the cryptographic data key, a third encryption envelope as a replacement for the second encryption envelope; and set the second cryptographic envelope key in a retired state wherein the second cryptographic envelope key is unavailable to decrypt encryption envelopes.

2. The system of claim 1, further configured to determine, based on at least one of a pseudo-random selection algorithm or a predetermined selection order, to generate the first request to access the first cryptographic envelope key prior to generating the second request to access the second cryptographic envelope key.

3. The system of claim 1 further configured to, in response to the request to retire the second cryptographic envelope key:

place the first group of cryptographic envelope keys in a locked state wherein any subsequent request for modification associated with any cryptographic envelope key of the first group is prohibited;

place the second group of cryptographic envelope keys in the locked state wherein any subsequent request for modification associated with any other cryptographic envelope key of the second group is prohibited;

determine that setting the second cryptographic envelope key in the intermediate state satisfies a verification criterion; and place the first and second groups of cryptographic envelope keys in an unlocked state.

4. The system of claim 1, further configured to:

generate a second encrypted snapshot of a second data volume using a second cryptographic data key;

generate, using the first cryptographic envelope key, a third encryption envelope comprising a first encrypted version of the second cryptographic data key;

obtain a third cryptographic envelope key of the second group of cryptographic envelope keys; and generate, using the third cryptographic envelope key, a fourth encryption envelope comprising a second encrypted version of the second cryptographic data key.

5. A computer-implemented method comprising:

under control of a computing system comprising one or more computing devices configured to execute specific instructions, receiving a request for a data set, wherein an encrypted version of the data set is encrypted using a data key;

determining, based at least partly on metadata associated with the encrypted version of the data set, to request a first envelope key, wherein a first encrypted version of the data key is encrypted using the first envelope key;

determining that access to the first envelope key is unavailable;

determining, based at least partly on the metadata, to request a second envelope key, wherein a second encrypted version of the data key is encrypted using the second envelope key;

receiving access to the second envelope key;

decrypting the second encrypted version of the data key using the second envelope key to obtain the data key; and generating a decrypted version of the data set using the data key and the encrypted version of the data set.

6. The computer-implemented method of claim 5, wherein determining, based at least partly on the metadata, to request the first envelope key comprises executing a pseudo-random selection process to select the first envelope key from a plurality of envelope keys associated with the encrypted version of the data set.

7. The computer-implemented method of claim 5, wherein determining, based at least partly on the metadata, to request the first envelope key comprises determining, based at least partly on a predetermined selection order of a plurality of envelope keys associated with the encrypted version of the data set, that the first envelope key is to be requested prior to the second envelope key.

8. The computer-implemented method of claim 5, wherein determining, based at least partly on the metadata, to request the first envelope key comprises determining to request the first envelope key from a first group of envelope keys, and wherein determining, based at least partly on the metadata, to request the second envelope key comprises determining to request the second envelope key from a second group of envelope keys that is different than the first group of envelope keys.

9. The computer-implemented method of claim 5, further comprising:

generating the encrypted version of the data set using the data key;

storing the encrypted version of the data set in a data store;

obtaining the first envelope key from a first group of envelope keys;

generating, using the first envelope key, the first encrypted version of the data key;

obtaining the second envelope key from a second group of envelope keys, wherein the second group of envelope keys is different than the first group of envelope keys;

generating, using the second envelope key, the second encrypted version of the data key; and storing the first encrypted version of the data key and the second encrypted version of the data key in a metadata store.

10. The computer-implemented method of claim 5, further comprising:

receiving a second request to set the second envelope key in a retired state in which the second envelope key is unavailable for generating new encrypted versions of data keys and unavailable for decrypting existing encrypted versions of data keys previously encrypted using the second envelope key, wherein at a time of the second request the second envelope key is in an active state in which the second envelope key is available for generating new encrypted versions of data keys and available for decrypting existing encrypted versions of data keys previously encrypted using the second envelope key, wherein the first envelope key is part of a first group of envelope keys, and wherein the second envelope key is part of a second group of envelope keys different than the first group of envelope keys;

placing the second group of envelope keys in a locked state;

setting the second envelope key in a removed state in which the second envelope key is unavailable for generating new encrypted versions of data keys and remains available for decrypting existing encrypted versions of data keys previously encrypted using the second envelope key;

determining that the second group of envelope keys, with the second envelope key set in the removed state, satisfies a verification criterion; and placing the second group of envelope keys in an unlocked state.

11. The computer-implemented method of claim 10, further comprising:

decrypting one or more existing encrypted versions of data keys previously encrypted using the second envelope key;

generating replacement encrypted versions of the one or more existing encrypted versions of data keys, wherein each replacement encrypted version is generated using an envelope key other than the second envelope key; and setting the second envelope key in the retired state.

12. The computer-implemented method of claim 10, further comprising:

placing the first group of envelope keys in the locked state in response to the second request; and determining that the first group of envelope keys satisfies the verification criterion;

wherein placing the second group of envelope keys in the unlocked state is based at least partly on the determining that the first group of envelope keys satisfies the verification criterion.

13. A system comprising:

computer-readable memory storing executable instructions; and one or more processors configured by the executable instructions to at least:

receive a request for a data set, wherein an encrypted version of the data set is encrypted using a data key;

determine, based at least partly on metadata associated with the encrypted version of the data set, to request a first envelope key, wherein a first encrypted version of the data key is encrypted using the first envelope key;

determine that access to the first envelope key is unavailable;

determine, based at least partly on the metadata, to request a second envelope key, wherein a second encrypted version of the data key is encrypted using the second envelope key;

receive access to the second envelope key;

decrypt the second encrypted version of the data key using the second envelope key to obtain the data key; and generate a decrypted version of the data set using the data key and the encrypted version of the data set.

14. The system of claim 13, wherein the one or more processors configured to determine, based at least partly on the metadata, to request the first envelope key are configured by further executable instructions to execute a pseudo-random selection process to select the first envelope key from a plurality of envelope keys associated with the encrypted version of the data set.

15. The system of claim 13, wherein the one or more processors configured to determine, based at least partly on the metadata, to request the first envelope key are configured by further executable instructions to determine, based at least partly on a predetermined selection order of a plurality of envelope keys associated with the encrypted version of the data set, that the first envelope key is to be requested prior to the second envelope key.

16. The system of claim 13, wherein the first envelope key is one of a first group of envelope keys, wherein the second envelope key is one of a second group of envelope keys, wherein the second group of envelope keys is different than the first group of envelope keys.

17. The system of claim 13, further comprising a first data store a second data store, wherein the one or more processors are configured by further executable instructions to:

generate the encrypted version of the data set using the data key;

store the encrypted version of the data set in the first data store;

obtain the first envelope key from a first group of envelope keys;

generate, using the first envelope key, the first encrypted version of the data key;

obtain the second envelope key from a second group of envelope keys, wherein the second group of envelope keys is different than the first group of envelope keys;

generate, using the second envelope key, the second encrypted version of the data key; and store the first encrypted version of the data key and the second encrypted version of the data key in the second store.

18. The system of claim 13, wherein the one or more processors are configured by further executable instructions to:

receive a second request to set the second envelope key in a retired state in which the second envelope key is unavailable for generating new encrypted versions of data keys and unavailable for decrypting existing encrypted versions of data keys previously encrypted using the second envelope key, wherein at a time of the second request the second envelope key is in an active state in which the second envelope key is available for generating new encrypted versions of data keys and available for decrypting existing encrypted versions of data keys previously encrypted using the second envelope key, wherein the first envelope key is part of a first group of envelope keys, and wherein the second envelope key is part of a second group of envelope keys different than the first group of envelope keys;

place the second group of envelope keys in a locked state;

set the second envelope key in a removed state in which the second envelope key is unavailable for generating new encrypted versions of data keys and remains available for decrypting existing encrypted versions of data keys previously encrypted using the second envelope key;

determine that the second group of envelope keys, with the second envelope key set in the removed state, satisfies a verification criterion; and place the second group of envelope keys in an unlocked state.

19. The system of claim 18, wherein the one or more processors are configured by further executable instructions to:

decrypt one or more existing encrypted versions of data keys previously encrypted using the second envelope key;

generate replacement encrypted versions of the one or more existing encrypted versions of data keys, wherein each replacement encrypted version is generated using an envelope key other than the second envelope key; and set the second envelope key in the retired state.

20. The system of claim 18, wherein the one or more processors are configured by further executable instructions to:

place the first group of envelope keys in the locked state in response to the second request; and determine that the first group of envelope keys satisfies the verification criterion;

wherein the second group of envelope keys is placed in the unlocked state based at least partly on the determining that the first group of envelope keys satisfies the verification criterion.

\* \* \* \* \*